United States Patent [19]

Swift et al.

[11] 4,287,564

[45] Sep. 1, 1981

[54] METHOD OF CORRECTING FOR MISALIGNMENT OF MICROFICHE FRAMES

[75] Inventors: William R. Swift, Placentia; Don W. Herrod, Walnut; James M. Marsh, Yorba Linda, all of Calif.

[73] Assignee: AM International, Inc., Los Angeles, Calif.

[21] Appl. No.: 25,974

[22] Filed: Apr. 2, 1979

Related U.S. Application Data

[62] Division of Ser. No. 939,445, Sep. 5, 1978.

[51] Int. Cl.³ .................. G05D 3/18; G06F 15/40; G03B 27/48
[52] U.S. Cl. .................. 364/525; 355/86; 355/95; 364/110; 364/518
[58] Field of Search .......... 364/100, 107, 110, 523, 364/525; 355/50, 53, 54, 86, 95

[56] References Cited

U.S. PATENT DOCUMENTS

| | | | |
|---|---|---|---|
| 3,563,648 | 2/1971 | Baggaley et al. | 355/53 |
| 3,674,367 | 7/1972 | Chapman | 355/53 |
| 3,813,159 | 5/1974 | Schlegel, Jr. | 355/53 |
| 3,953,123 | 4/1976 | Jesensky et al. | 355/53 |
| 4,097,143 | 6/1978 | Buchanan et al. | 355/53 |
| 4,142,794 | 3/1979 | Trump | 355/53 |
| 4,155,642 | 5/1979 | Lacombat | 355/53 |

Primary Examiner—Felix D. Gruber
Attorney, Agent, or Firm—Robert S. Hulse; A. W. Karambelas

[57] ABSTRACT

A method of reading selected ones of an array of data frames from a microfiche medium substantially without errors attributable to misalignment of the frames. The method, which utilizes a microfiche reader-printer in adjusting for misalignment of the frames, includes the steps of determining the average distance between the frames along a first selected axis (e.g., the X-axis) of the array, and using said average distance in positioning the frames along the axis for reading. The frames are separated from each other by a predetermined nominal distance along the axis. The average distance is determined by dividing the distance between the outermost frames along the axis (the distance between the outermost frames being expressed in terms of the number of stepper motor steps needed to traverse said distance) by one less than the number of frames along said axis to produce a quotient, and adding the quotient to the predetermined nominal distance. A similar calculation of average distance between frames along a second selected axis (e.g., the Y-axis) is performed prior to positioning selected frames along said second axis for reading.

1 Claim, 16 Drawing Figures

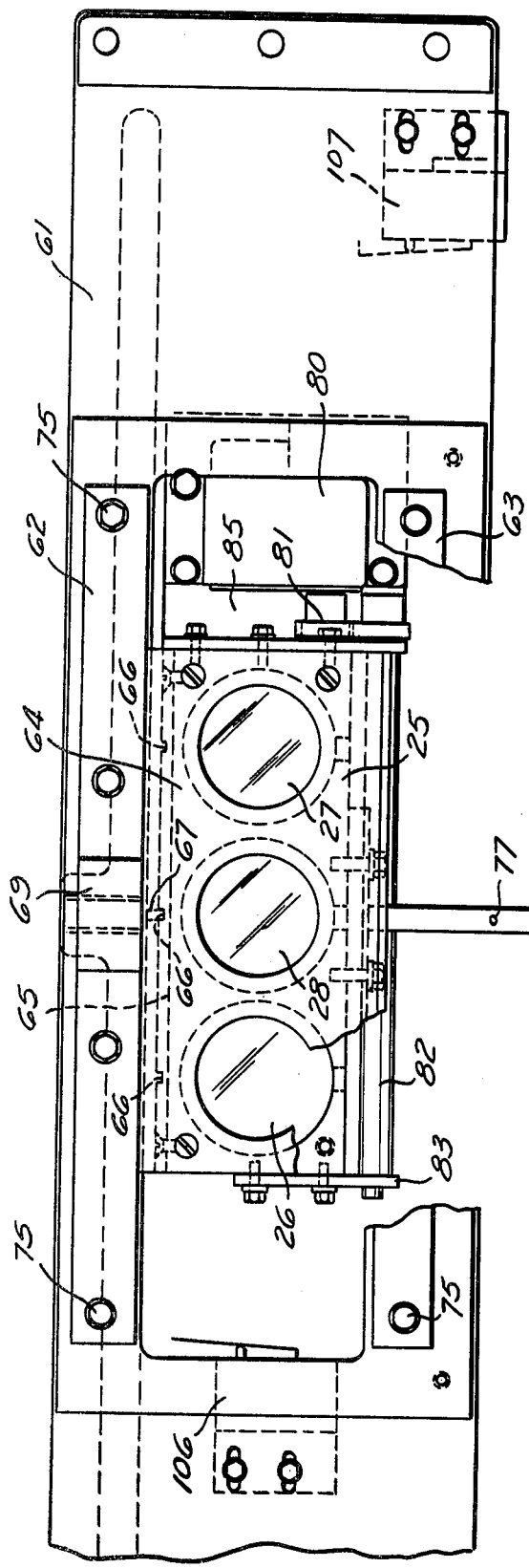
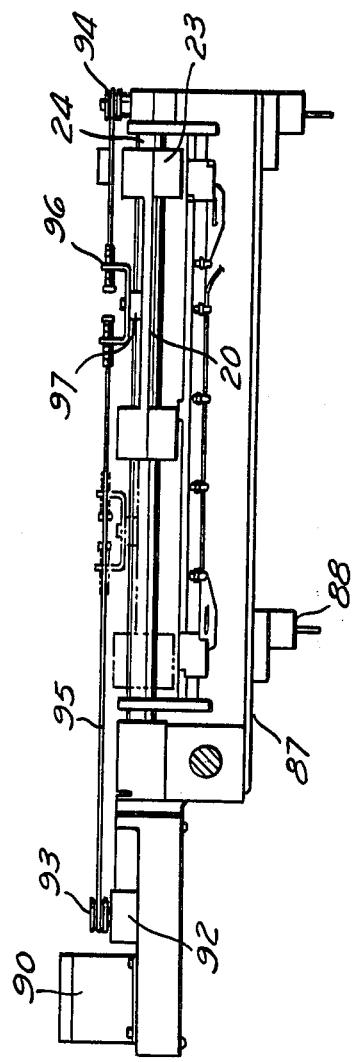
Fig. 5
Fig. 9

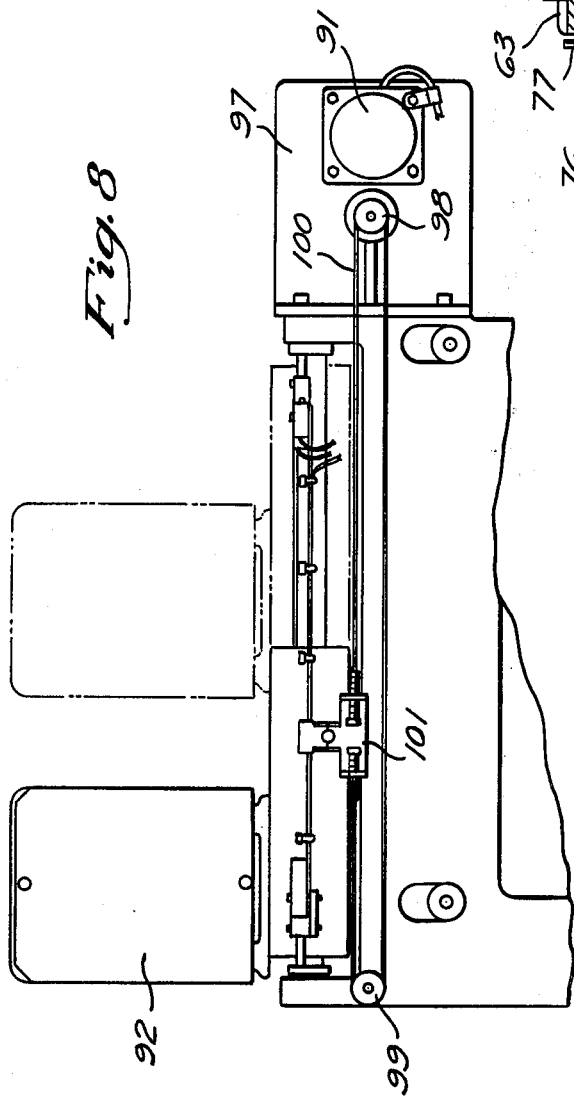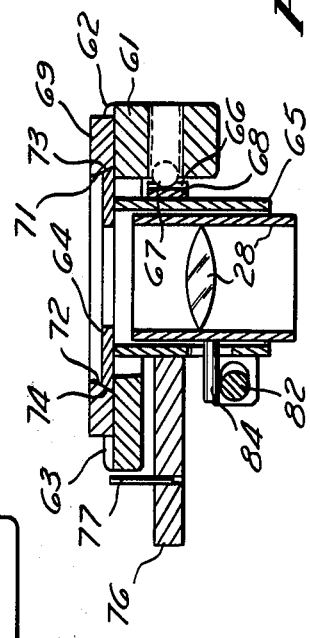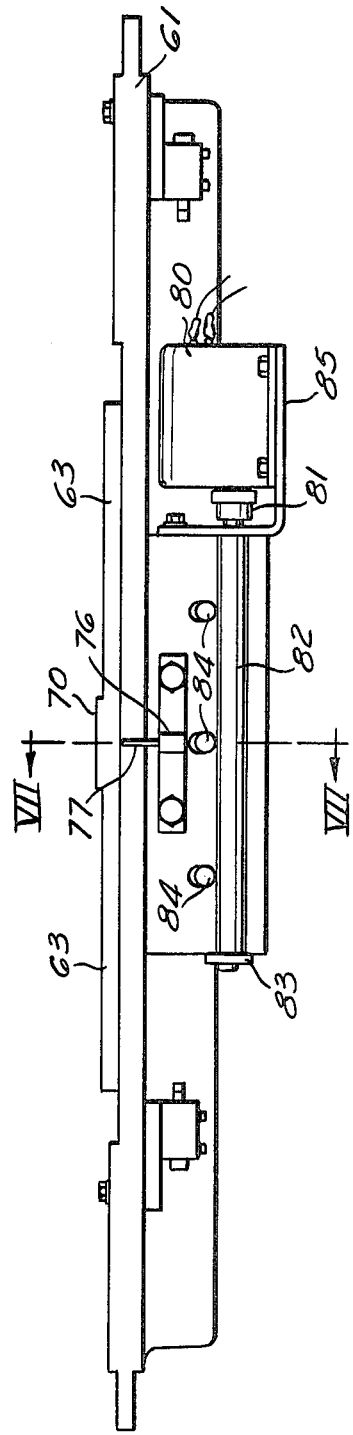

METHOD OF CORRECTING FOR MISALIGNMENT OF MICROFICHE FRAMES

This is a division of application Ser. No. 939,445 filed Sept. 5, 1978.

BACKGROUND OF THE INVENTION

This invention relates in general to microfiche reader printers and specifically to microfiche reader printers having multiple format capabilities, and the capability to adjust for misaligned or skewed frames of data during the reading of data from the microfiche.

Microfiche reader printers vary in complexity. In the most simple, the operator manually moves the platen holding the microfiche to a location where a correct frame is projected in a viewing screen. A pointer may be connected to the platen, and a frame guide may be printed below the pointer so that the operator can locate desired frames easier. After the desired frame is located, the magnified image is reflected to a printer where it is printed, often on sensitized paper.

More complex reader printers have automatic addressing so that manual searching for the desired frame is eliminated. In these systems, the microfiche is inserted into the platen in a set orientation, and the machine moves the platen a specific distance from an indexing location to the desired frame. Two stepping motors, one for the x and y coordinates are employed, and the distance between frames can be translated into a number of steps for stepping motors. Many of these machines only have the capability of making a single print.

Still more complex reader printers are substantially more automated. Such machines may be programmed to copy automatically a series of frames. After the operator positions the microfiche and selects the correct printing sequence, the machine automatically moves the platen and microfiche from frame to frame and copies each frame. These machines frequently operate at high speeds and use xerographic printing to accommodate the higher speeds.

A number of problems have been recognized in reader printers, and it is an object of the present invention to disclose and provide solutions to the problems. The first relates to multiple formats. If a reader printer is owned by a document storage company, its customers may store data on microfiches of different formats. Even a single company may use different formats for data of different sizes.

Microfiche is generally of standard size 148.75 mm (5.86 in)×105 mm (4.13 in), but microfiche is produced in nine different formats standardized by the National Microfilm Association. The following seven formats are most frequently used.

needed for full blowback and the remaining numbers indicate the number of frames. Thus, format 2498 is magnified by 24 power, and it contains 98 frames. By blowing back less than 100%, the machine compensates for positional inaccuracies and for failure for the frame size to have dimensions exactly proportional to the 8½ in×11 in (216 mm×279.4 mm) copy.

If an automatic reader printer is designed for multiple format microfiche, certain problems are created. The first relates to indexing. If frames are of different sizes, then corresponding frame indexes will yield different positions on different format microfiche. For example, in format 2060, a command to index to the fifth row and twelfth column would index the machine to the frame at the lower right corner of the microfiche. If format 48420 were used, the same command directs the reader printer to a frame near the middle of the microfiche.

Multiple format readers have been previously provided. One such reader is the Bruning Model 97 reader manufactured by the assignee herein. It has two lenses for different magnifications, and switching from one lens to the other modifies the controller to compensate for the different frame locations on different format microfiche. In the Model 97, switching between the two lenses modifies the control circuit which controls the motors which drive the platen to the correct location. The Model 97 is not a printer, however, and printing creates its own set of problems.

The problems are minimal if printing is done on a stationary photoreceptive medium with the image of the entire frame being projected to the entire stationary photoreceptive medium. However, such copiers are inherently slow, and a higher speed copier requires scanning of the frame and projecting the scanned portion to a moving photoreceptive medium. The immediately adjacent frame areas are projected to immediately adjacent areas on the photoreceptive surface so that the entire frame is ultimately projected to the moving photoreceptive medium. The present invention uses a rotating xerographic drum, but xerographic or photographic belts could also be used.

There must be coordination between the movement of the frame in the path of the light and the rotation of the xerographic drum. New formats change the relationship. For example, with format 2060 microfiche, the frame must be scanned horizontally 11.75 mm each time the xerographic drum rotates once, but the horizontal scan of format 48420 is only 5 mm. Therefore, unless the horizontal scanning speed of the frame of microfiche is modified with respect to the rotation of the xerographic drum, the copying will be incorrect.

Another problem relates to maintaining constant velocity during scanning. Stepper motors, which are used to drive the platen holding the microfiche, do not have

| FORMAT | MODE | VERTICAL SPACING | HORIZ SPACING | NO. ROW | NO. COL | BLOWBACK RATIO | BLOWBACK % FULL |
|--------|-------|------------------|---------------|---------|---------|----------------|-----------------|
| 2463   | CINE  | 12.5 mm          | 15.5 mm       | 7       | 9       | 17             | 70              |
| 2060   | COMIC | 16.5             | 11.75         | 5       | 12      | 18             | 90              |
| 2498   | COMIC | 12.5             | 10            | 7       | 14      | 21.5           | 90              |
| 42208  | CINE  | 7                | 8.75          | 14      | 16      | 30             | 70              |
| 42325  | COMIC | 7                | 5.5           | 13      | 25      | 38             | 90              |
| 48270  | CINE  | 6.25             | 7             | 15      | 18      | 34             | 70              |
| 48420  | COMIC | 6.25             | 5             | 15      | 28      | 43             | 90              |

The CINE mode produces sequential pages along a column top to bottom, and the COMIC mode produces sequential pages along a row left to right. The first two numbers of the format indicate the magnification constant velocity drive between steps. Certain prior art devices use synchronous motors to drive the platen during scanning. As successive windings are energized, the torque on the rotor varies as the rotor moves between winding. This produces a somewhat jerky motion for the platen. Although these jerks are small, they result in unclear copies.

The stepper motor also has difficulty accelerating the platen. If the scan starts at the beginning of a frame, the platen will be moving at an increasing velocity at the beginning of the frame, have constant velocity over the center of the frame and moving at decreasing velocity at the end of the frame.

Other problems relate to the magnification itself. Formats of different magnifications will need lenses of different magnifications, and the chosen lens will have to be moved into and out of the light path. Because of the high degree of magnification required, there is an extremely small depth of focus. Therefore, the distance from the film plane to the focused lens must remain constant as the machine moves from frame to frame. If not, as the machine automatically proceeded from the lower right frame to the upper left frame, the images of certain frames may be out of focus. Because such machines are intended to be substantially automatic, the operator cannot continually check on the focus of intermediate frames. The problems are greater with multiple lenses because the play necessary to allow movement of different lenses into the light path may create inaccuracies in positioning the lens.

In the prior art, one of the ways of maintaining the position of the lens with respect to the film surface was to carry the lens in a brass holder and rest the holder on the glass platen. Moving the platen beneath the lens, therefore, would not affect the distance from the microfiche to the focused lens. Resting the brass covers on the platen creates problems. In the present invention, the printer is below the platen so that the lenses must be mounted below the platen. The brass can also scratch the glass platen.

Simplicity of operation is also a concern. It is more complicated, for example, to require an operator to choose a particular lens for the format and then to have the operator also be required to set controls corresponding to the format for scan rate and indexing. Ideally, the machine would automatically switch indexing and scan when a new lens is chosen.

Focusing is also a concern. Each time a lens is chosen, it will have to be focused, and it is preferable to do the focusing mechanically rather than manually. The normal way of focusing these lenses is to merely move them toward or away from the film plane. Such movement can be accomplished by gears tied into motors.

It is uneconomical, however, to have a motor for each lens, and it is desirable to have a single motor focus all lenses. Because the focus of the lenses that are not being immediately used is unimportant, the focusing motor can move all three lenses simultaneously until the lens being used is in focus. Positive drive between the lenses and the motor is not desirable. If the lens reaches its fullest travel, the lens will stop the motor. In order to avoid damage to the motor, an expensive clutch may be necessary. Separate controls will also be required. Therefore, it would be desirable if continued motor rotation reciprocated the lens.

Microfiche is produced in standard formats, but careless operators and worn machines can produce microfiche that does not conform to specifications. For example, assume that in one format having 10 frames in the y direction the nominal distance between outermost frames is 140 mm. If the platen has positioned one of the outermost frames in the light path, a command to move 140 mm in the y direction would position the other outermost frame in the light path. Actually, in the present invention, the command would be to move a certain number of steps, and the distance between outermost frames would be stored as a number of steps.

If the outermost frames are only 135 mm apart, if the first frame is aligned, a command to move to the other frame will result in missing the frame by 5 mm. In slower reader printers where each frame is viewed before printing, and the operator centers each image before printing, the problem is avoided, but where printing of frames are automatically sequenced, the operator offers little or no manual control.

The alignment problem is further complicated if the rows in the COMIC mode or columns in the CINE mode are skewed. In the COMIC mode, if movement along the y axis does not have compensating x correction, each successive frame will be incorrectly positioned either upward or downward.

As was previously stated, the object of the present invention is to disclose and provide a reader printer and a method of reading and printing microfiche that solves many of the problems of the prior art. In the foregoing description, a number of other problems are also mentioned, and it is an object to this invention to disclose and provide a reader printer that solves the problems.

SUMMARY OF THE INVENTION

In order to solve the alignment problem, the microfiche reader-printer of the present invention computes an average distance between frames. Stored in memory is the nominal distance between the outermost frames. Upon initiation of the align sequence, an indexing frame is viewed. The indexing frame is an outermost frame. By means of verniers which are connected to the stepping motors, the platen is moved slightly to center the image in the viewing screen. Next, the platen is moved in the y direction to the opposing outermost frame, and it is again centered by means of the vernier controls. A first y adjustment factor is computed by counting the number of steps necessary in the y direction to affect adjustment and dividing that by the number of frames in the row minus 1 which yields an average error between frames. The same procedures take place upon x movements. Thereafter, in moving from frame to frame, the controller adds the adjustment factor to each move. In order to correct for skewing, there are two sets of adjustments for each coordinate. The two y adjustments correct improper spacing during moves in the y direction and improper alignment during moves in the x direction. The x adjustment works similarly.

The methods of the present microfiche reader-printer system also include the method of modifying the movement of the microfiche during scanning and during movement to successive frames in accordance with the lens, which was chosen with regard to the format, the alignment method and the scanning method.

One portion of the present system also relates to the mounting means for the lens. Mounting means includes a pair of parallel gibs. A lens support in which the lenses are mounted is slidably mounted between the gibs whereby sliding the lens support positions a chosen lens in the light path from the light source and microfiche to the copier. A land area is on each gib, and the platen rests on the land areas. Because the focused lens is secured in the lens support, because the lens support is fixed (except for sliding) between the gibs and because the platen is fixed vertically to the land areas which are fixed to the gibs, the distance between the platen and the focused lens is maintained constant.

Another part of the present system includes the unique focusing means. In the present system, the lenses are arranged in a straight line and all lenses are focused simultaneously. Focusing is accomplished by moving the lens in the lens support toward or away from the platen. The focusing means comprises a pin extending outwardly from each lens. An eccentric shaft extends under each pin for supporting the pins and the lenses at distance from the platen. A focus motor rotates the eccentric shaft and the eccentricity raises and lowers the pins and the lenses with respect to the platen.

Another feature of the present system is the control means. When the lens support slides between the gibs and a lens is positioned in the light path, a sensing means in the form of switches senses the position of the lens support. The switches signal the control means to adjust the platen drives for different frame-to-frame movements and for adjusting the speed at which the platen moves to scan the frame being copied to compensate for different microfoche formats.

Specifically, the circuitry provides for one branch for each lens and for each format, and the sensing means selects the format for the lens position in the light path. The format data and platen speeds during copying for each format are stored in memory, and each branch has a switch that directs the branch, when activated, to the portion of the memory containing the format data relating to the format for that branch. Each branch also has a speed adjustment switch for fine tuning the platen speed during copying for that branch. This accommodates format variations.

The present system also utilizes a digitized sine wave to cause the stepper motors to approximate AC motors to obtain constant velocity. This is done by varying the voltage to adjacent motor windings by changing the digital current input to the motor windings. As the voltage to one winding gradually increases, the voltage to the second winding gradually decreases giving a more uniform torque curve.

Because the velocity of the platen changes during acceleration, the present system steps the platen backward approximately ½ frame and then reverses the motor to accelerate back over that half frame. Therefore, when the frame being copied reaches the light path, the platen is moving at constant speed. Deceleration takes place over approximately ¼ of the subsequent frame. As copying continues, this process of backward motion preceding acceleration and forward constant velocity motion continues from frame to frame across the microfiche.

BRIEF DESCRIPTION OF THE DRAWINGS

FIG. 5 is a plan view, partially cut away of the lens support of the present invention.

FIG. 6 is a front view of the lens support of the present invention.

FIG. 7 is a sectional view of the lens support of the present invention taken through plane VII—VII of FIG. 6.

FIG. 8 is a bottom view of a portion of the platen moving means.

FIG. 9 is a side view of a portion of the platen moving means taken through plane IX—IX of FIG. 4.

DETAILED DESCRIPTION OF THE PREFERRED EMBODIMENT

Description of Entire Machine

Figure 1:
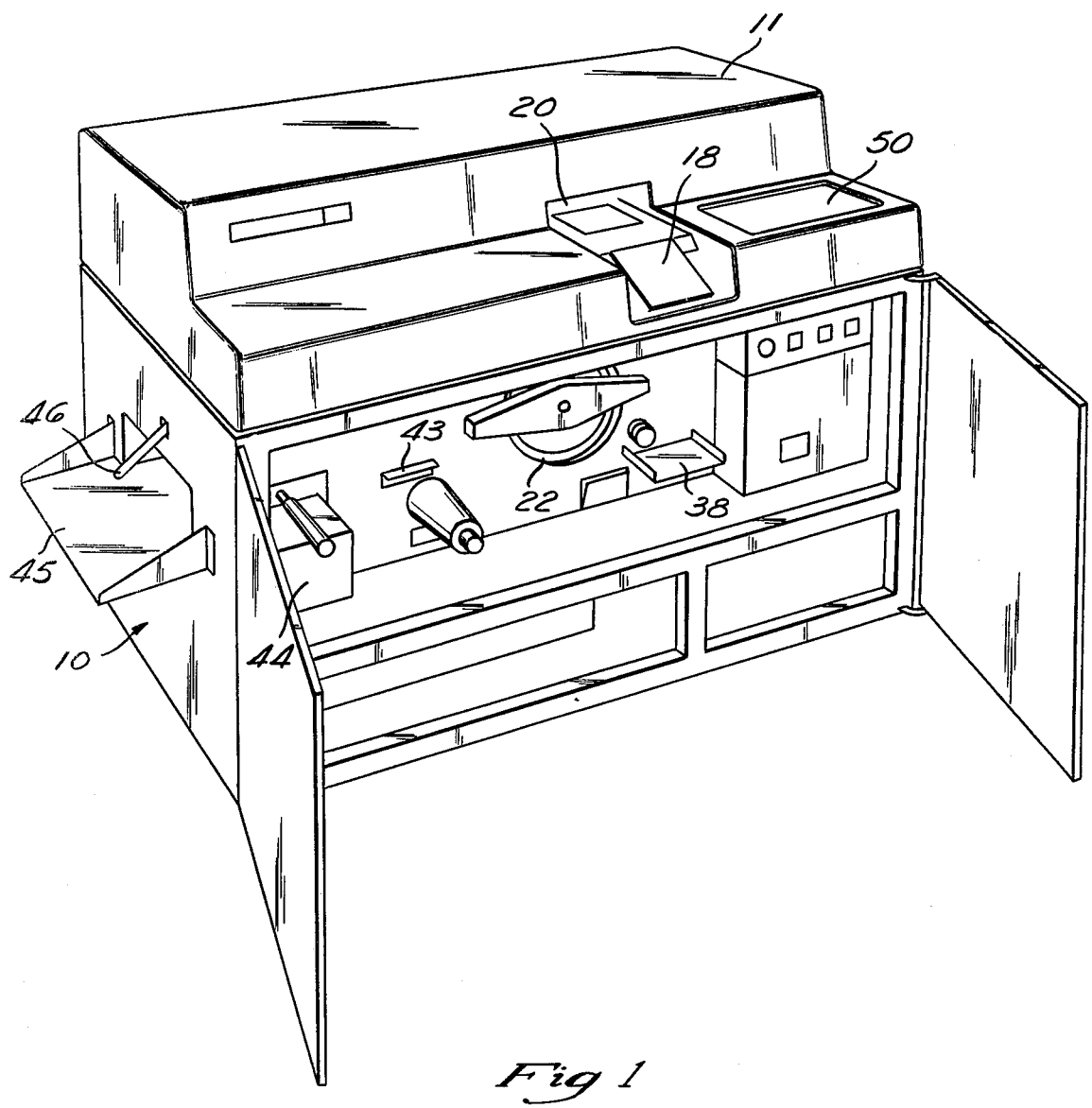
FIG. 1 is a front view of the reader printer of the present invention with the front doors open exposing some of the internal parts.
Figure 2:
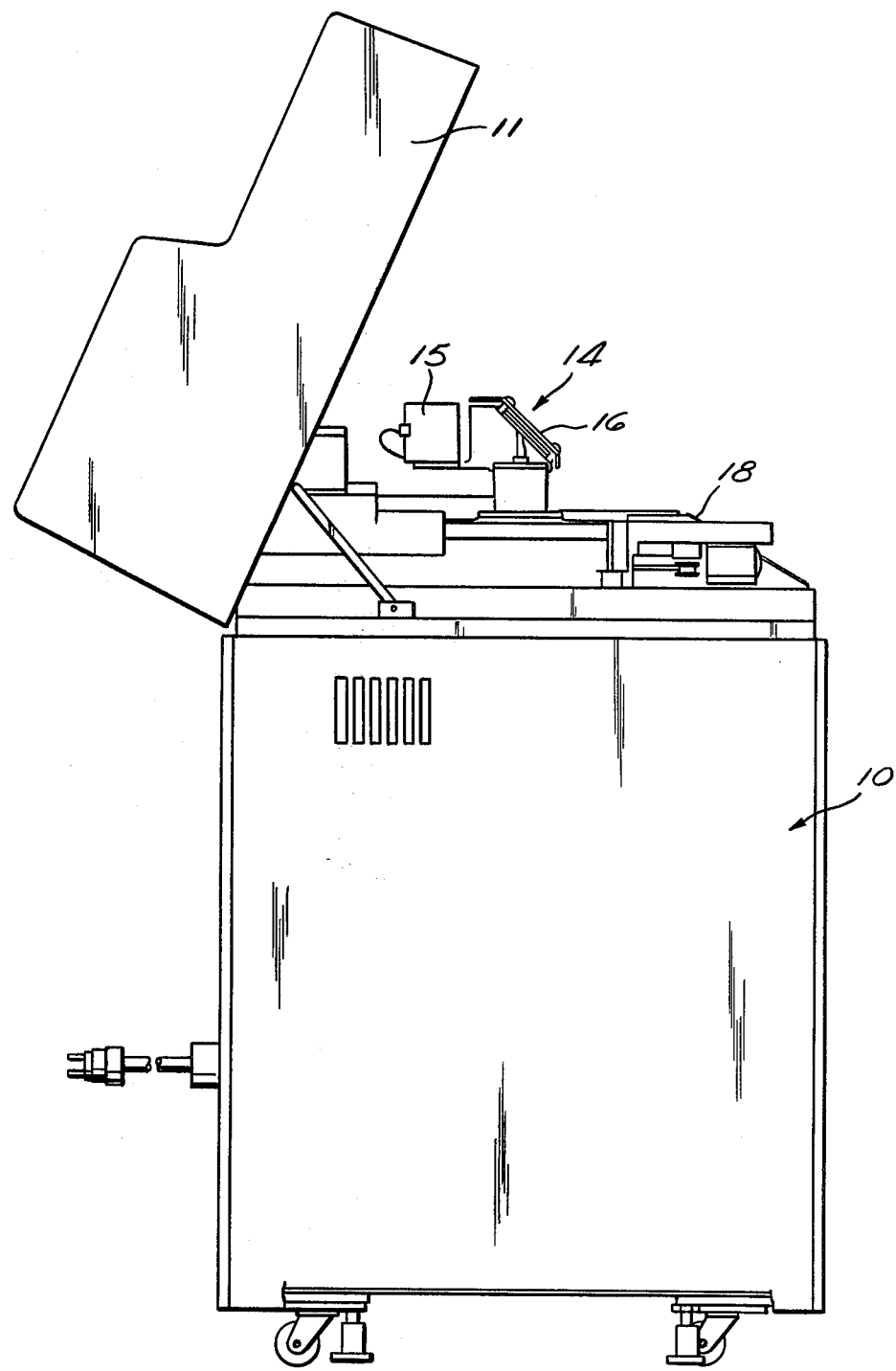
FIG. 2 is a side view of the reader printer of the present invention with the top cover open.

FIGS. 1 and 2 show the entire machine. Briefly, the reader printer of the present invention comprises a base having a hinged cover 11 mounted thereon. Light source 14 (FIG. 2) includes a lamp mounted in lamp housing 15 which directs light to reflector 16 where it is directed through microfiche 21 (FIG. 3) mounted in platen 20. By means of optical elements discussed hereinafter, the image from the microfiche is either directed to view screen 18 or xerographic drum 22.

The optical system operates as follows. Light from source 14 is directed through microfiche 21 (FIG. 3) which is held in place by movable platen 20. Magnifying means in the form of lens 26 receives an image from the microfiche and magnifies the image. As discussed in more detail hereinafter, lens 26 is chosen from a plurality of lenses mounted on a lens support which allows one of the plurality of lenses to be moved into the light path. From the magnifying lens 26 the image is directed to mirror 29. In the position shown in solid in FIG. 3, the image from mirror 29 is reflected to mirror 30 where it is again reflected to drum 22. Alternatively, mirror 29 can be pivoted to its phantom position where the image is reflected to viewing screen 18. Because of the shorter distance between magnifying lens 26 and viewing screen 18 than between magnifying lens 26 and drum 22, a diopter lens 31 is positionable in the light path to shorten the focus. It is operably connected to mirror 29 so that when the mirror pivots to reflect the image to view screen 18, the diopter lens 31 is automatically positioned in the light path.

It will be recognized that many other optical systems are possible. Instead of having mirror 29 pivot, for example, a mirror could be movable into and out of the light path to selectively direct the image to the view screen.

The copier of the present invention utilizes an electrostatic dry process in which selenium drum 22 is first given a positive charge by corona 36. The drum is then exposed to the image. The positive charge on the drum surface is dissipated in relation to the intensity of the light. The positive charge remaining on the drum surface forms the latent image. Relatively negative toner particles are applied to the drum from toner supply container 38 by means of a magnetic brush 37. The positively charged latent image attracts the toner to form a visible image. The image is transferred to a sheet of copy paper 39 as it passes over negative DC transfer corona 40. The negative charge of the transfer corona is greater than the positive charge of the drum. Therefore, because the drawing effect of the corona overcomes the holding effect of the drum, the image is transferred to copy paper 39. Any charge remaining on the drum surface is neutralized as it passes an AC corona 41. Any remaining toner is brushed off the drum by brush 42 and is then vacuumed into a disposable bag 43. Copy paper 39 passes through fuser rollers where it is directed to holding tray 45. Tray 45 may be provided with a sensor 46 to warn the operator or shut off the machine when tray 45 is too full.

Figure 3:
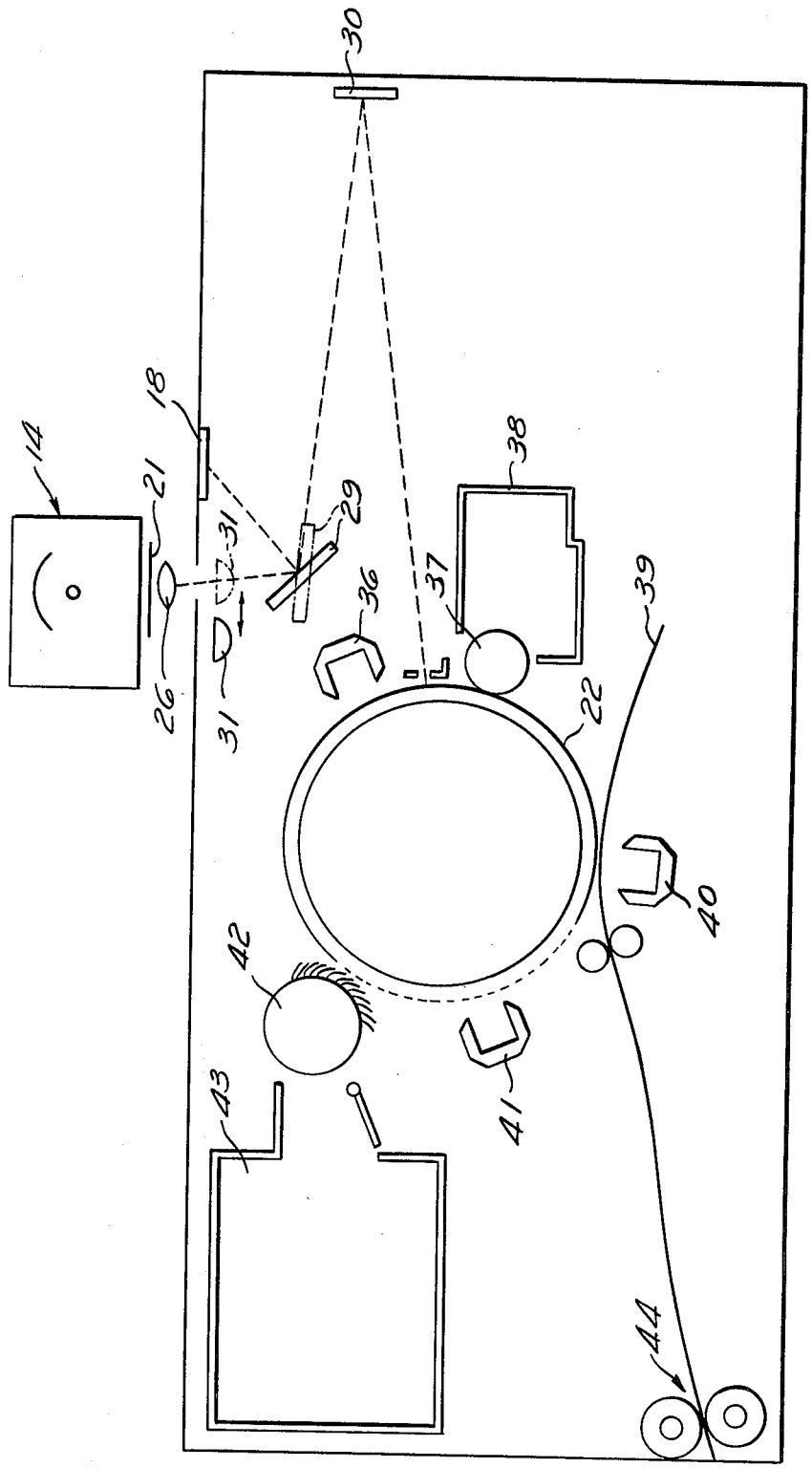
FIG. 3 is a schematic of the copier portion of the reader printer of the present invention.

Some of the parts discussed in FIG. 3 are shown in their true location in the machine in FIG. 1. For example, toner supply 38 is shown in FIG. 1 and is accessible to the operator so that he can add toner. Selenium drum 22 is also visible for cleaning and other maintenance. The toner disposing container 43 also has access to the front of the machine so that excess toner can be removed, and a portion of fuser 44 is also accessible.

The Lens Support

The lens support of the preferred embodiment is shown in FIGS. 5, 6 and 7. In the exemplary embodiment, lens support 25 holds three lenses, 26, 27 and 28. Three lenses were chosen in the exemplary embodiment for size reasons. A larger machine could accomodate more lenses. However, many persons who need multiple format capabilities only use three different formats. With the teachings herein, one of ordinary skill in the art could modify this device to use more than three lenses.

Mounting means are provided for mounting the lens support for movement to position one of the lenses in the light path. The mounting means comprises a pair of parallel gibs, and the lens support is slidably mounted between the gibs such that sliding the lens support between the gibs positions a chosen lens in the light path. In the exemplary embodiment, the mounting means comprises a main frame 61 (FIG. 5). Upper and lower parallel gibs 62, 63 are securely mounted on the main frame. Each gib is machined and finished to high tolerance and is correctly positioned and fastened to main frame 61 by screws 75.

Lens support 25 includes a lens board 64 attached to board frame 65 (FIG. 7). The bottom of lens board 64 rests on main frame 61 and the front and rear edges 73, 74 are held by the inner edges 71, 72 of gibs 62 and 63 respectively. As shown in FIG. 7, edges 71 and 72 slant upwardly and inwardly corresponding to the slant of edges 73 and 74 to secure lens board 64 against main frame 61. It is important that lens board 64 be held securely, especially in the vertical direction, because any movement up or down will move lens 28 thereby taking the magnified image from the microfiche out of focus.

The precision surface of edges 71, 72, 73 and 74 allows lens board 64 to slide along the parallel gibs thereby moving one of the lenses 26, 27 or 28 into the light path.

Mounted to the rear of board frame 65 is bar 68 which has a plurality of indentations 66 cut therein. Each indentation is centered with respect to one lens. A line extending down the page in FIG. 5 would pass through the center of the light path. A roller 67 is urged by a spring (not shown) to the left in FIG. 7 or downward in FIG. 5 into an indentation when a lens is correctly oriented in the light path so that the person moving the lens will sense the correct position.

In order to assist the operator in moving lens support 25, a handle 76 is attached to board frame 65 and extends in front of main frame 61 where it can be reached by an operator. A pin 77 extends upward from handle 76 to the top of main frame 61 adjacent the pin. A set of indicia 78 (FIG. 4) are mounted on the main frame near the pin. The indicia indicate different microfiche formats, and the operator making a copy of frames of microfiche moves handle 76 to one of the three format indicia to move the correct lens corresponding to the magnification of the format into the light path.

Lens Focusing

The reader printer of the present invention further comprises focusing means attached to each lens for adjusting the focus of each lens simultaneously. It will be recognized, however, that because only one lens is in the light path at one time, the focus of the other two lenses is irrelevant. However, the single focusing means which moves all three lenses up and down simultaneously add simplicity to the present invention.

The lenses are mounted in a straight line, and focusing is accomplished by moving the lens toward or away from the platen. The focusing means comprises a pin 84 fixed to lens 28. As pin 84 moves upward and downward in FIG. 7, the lens will also move upward and downward. An eccentric shaft extends under each pin for supporting the pins and the lenses at distances from the platen. In the exemplary embodiment, eccentric shaft 82 extends between shaft supports 83 on either ends thereof (FIG. 5). One end of eccentric shaft 82 is eccentrically mounted to gearing 81 of focus motor 80. As focus motor 80 drives gearing 81, shaft 82 rotates. The eccentricity of the mounting of shaft 82 raises or lowers pins 84 to raise and lower the lenses thereby focusing the lens being used.

Figure 4:
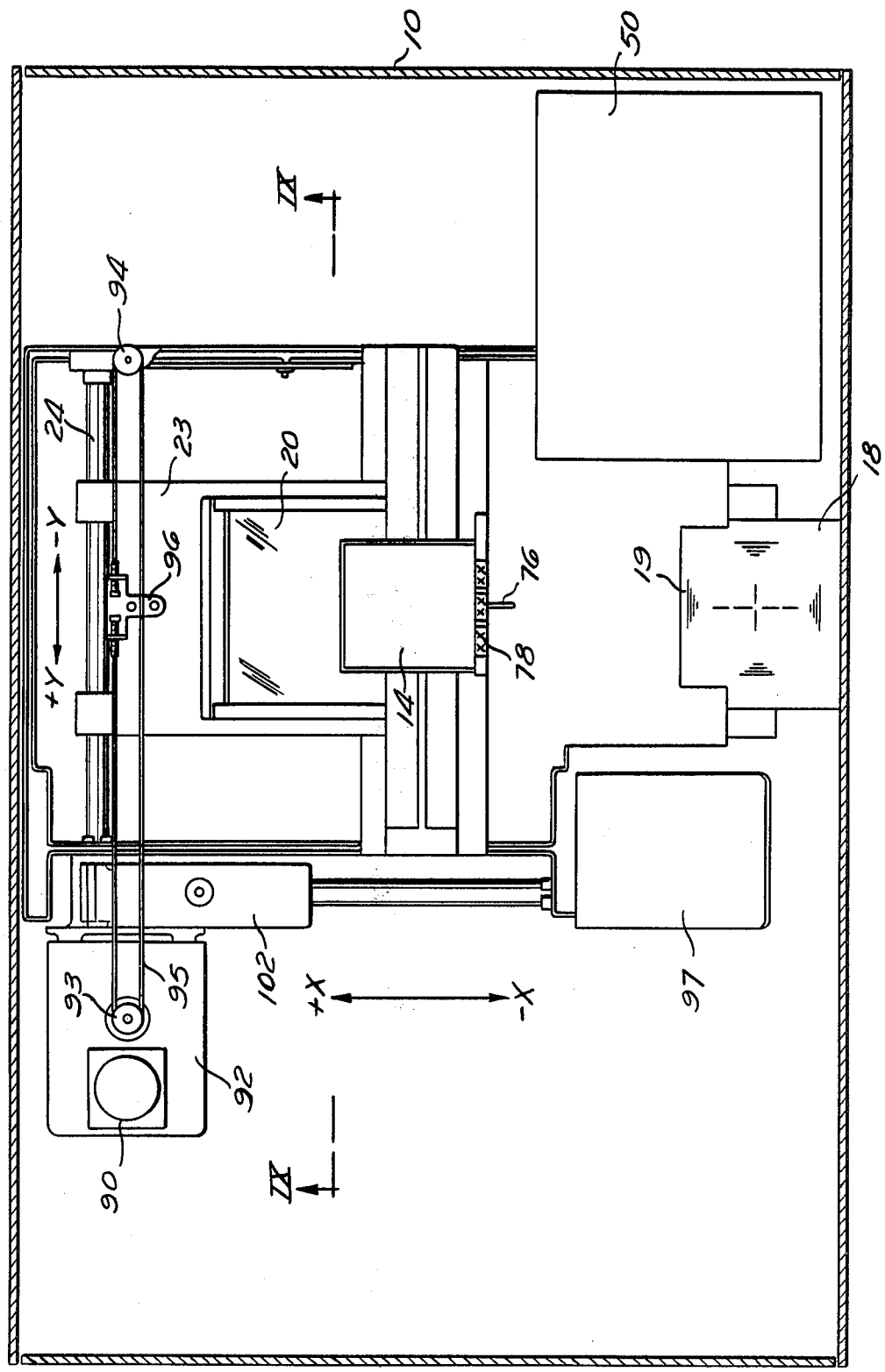
FIG. 4 is a plan view partially in section showing the detail of the platen, the means for moving the platen, the lens support, and the viewing screen.

The correct focus is judged by the operator who attends to focusing when the image is projected to the view screen 18 (FIGS. 1 and 4). The "focus" buttons (FIG. 10) direct the motor to rotate the eccentric shaft in either the + or − directions (arbitrary), but it is recognized that a single direction rotating shaft would suffice because the rotation will always return the shaft to any desired position. Rotation in either direction is preferred, however, because if the operator overshoots the correct focus, he or she can reverse the motor a short distance to reach the correct focus.

Movement of the Platen

The vertical position of the platen must be held constant with respect to the focused lens if lens focusing is to be maintained. It should be remembered that the device is automatic so that once focusing of a particular microfiche is accomplished, the platen will move sequentially to print different frames. Therefore, because of the distances traveled from one end of the microfiche to the other, focusing errors could be greatly magnified.

In order to maintain the distance between the platen and the focused lens constant, the platen slides on a land area which is a part of each gib 62 and 63. These land areas 69, 70 are of a precision finish so that the glass of the platen can slide along with minimum friction and without becoming scratched. Any precision finished metal would suffice, or the land areas may have a friction resisting surface. Normal lubrication cannot be used, however, because the lubricant would dirty the glass platen.

Throughout its movement, the platen rests on the land areas. Because the land areas are tied to the main frame 61 which is in turn tied to lens support 25 in a fixed relationship, the lens is maintained a fixed distance from the platen throughout its entire movement. It will also be noted that the land areas 69 and 70 are immediately nearest the lens in the light path so that the portion of the platen at which the distance to the focused lens is critical is the area in which the critical distance is best maintained.

The platen is essentially moved by motors in two coordinates. The motors operate in a unique manner and the controls for the motors are also unique. Explained in this section, however, are the mechanical movements that the motor accomplishes. Although somewhat unconventional, movement from left to right or right to left is signified in FIG. 4 as being in the y direction while up and down movement in FIG. 4 is indicated as in the x direction.

Movement of the platen in the y direction is accomplished by a stepper motor 90 which through gearing in gearbox 92 rotates drive pulley 93 to advance cable 95, which also extends around idler pulley 94. The ends of cable 95 are attached to a bracket 96 which is fixed to platen support 23. Platen support 23 holds the glass portion of the platen 20. Part of platen support 23 extends around shaft 24 on which the platen slides. Rotation of pulley 93 by y motor 90 causes the cable to pull on bracket 96 thereby pulling platen 20 in either the +y or −y directions. Bracket 96 has a fitting for adjusting the tightness of cable 95.

X motor 91 operates in a similar manner. As shown in FIG. 8, motor 91 is mounted on gearbox 97. Through appropriate gearing, motor 91 drives x pulley 98 to advance cable 100 which extends around idler pulley 99. Both ends of cable 100 are attached to x bracket 101 which also has fittings for adjusting the tightness of cable 100. Bracket 101 is attached to y motor bracket 102. As the x motor 91 causes pulley 98 to rotate in either direction, the cable 100 pulls in either direction on bracket 101 which is turn pulls in either direction on y motor bracket 102 and the entire assembly for y motor 90 including the gearbox and the associated cables moves in the x direction (FIG. 4). Y motor bracket 102 is also attached to shaft 24 so that as the y motor moves in the x direction, platen 20 also moves in the x direction. By coordinating the movement from y motor 90 and x motor 91, platen 20 can be moved in the x and/or y direction to any desired position.

Scanning

As has previously been discussed, the movement of the frame of microfiche through the right path is coordinated with the rotation of the drum. The present reader printer is designed to print on standard letter size paper (8½"×11"), although it can be modified to print on other size paper. The paper is fed along the drum in a direction perpendicular to the long (11") side. Therefore, the microfiche must be oriented such that the direction of movement of the microfiche is perpendicular to the longer dimension of the frame. It should be noted that the long frame dimension does not necessarily correspond to the long side of the microfiche.

Microfiche in the COMIC mode is usually taken from letter size source documents. The long side of a frame is usually parallel to the short side of the microfiche. The CINE format is usually used for copying computer printouts and similar sized documents. In those, the longer dimension of each frame corresponds to the longer dimension of the microfiche. When such a format is used, the microfiche must be positioned in the platen such that the long edge of each frame and consequently the long edge of the microfiche is parallel to the axis of the xerographic drum. Referring to FIG. 1, microfiche must be oriented such that the long dimension of each frame is along the right wall of platen 20.

Figure 10:
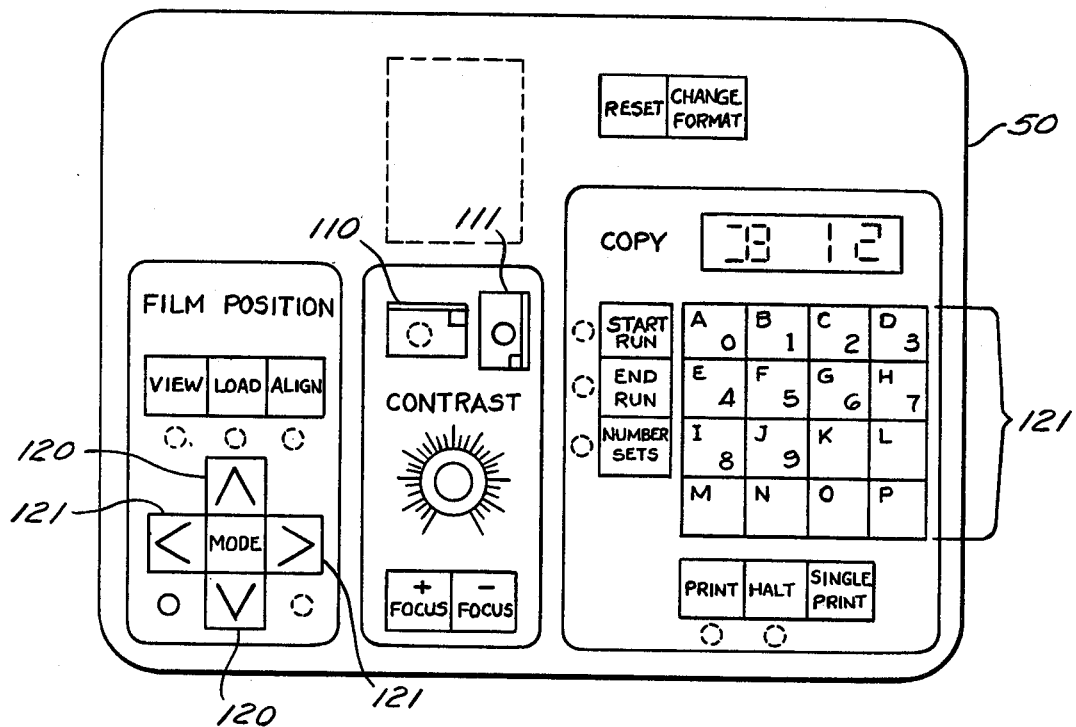
FIG. 10 is a view of the control panel of the present invention.

Once the desired format is chosen, the viewer printer controller indicates on controlled panel 50 the correct orientation of the microfiche into the platen. This is shown at areas 110, 111, one of which lights after the format is chosen (FIG. 10).

From the foregoing, it is recognized that the scan of the microfiche always proceeds perpendicular to the long edge of the frame.

It is difficult to coordinate the speed of the xerographic drum with the platen movement. In a regular full size document copier, variations in the scan rate are not critical, but slight variations in the platen speed of a microfiche reader printer can result in illegible copies. If the platen moves too fast, the information will be shrunk in a direction along the short side of the paper. If the platen moves too slowly, the image may overblow the copy paper. The difficulty of the problem is best illustrated by remembering that for example with 48420 format microfiche, where each frame has a 5 mm horizontal dimension, the copy paper will be moving 216 mm (8.5 in). These problems are made more difficult because of the multiple format capabilities of the present machine.

The scanning during printing is done only along the y axis. Movement along the x axis only serves to position the microfiche to position a frame in the light path, a function that sometimes shares with y motor 90. Both x motor 91 and y motor 90 are stepper motors which rotate through a series of steps as pulses are applied to the motor windings in order. The electrical controls for the stepper motors 90 and 91 will be discussed in detail hereinafter. Briefly, however, the controls provide for rapid, controlled acceleration for y motor 90.

The control means has computer input. Stored within the computer is the following information reproduced in tabular form:

| COMPUTER FORMAT DATA TABLE | | | | | | | | |
|---|---|---|---|---|---|---|---|---|
| FICHE | FORMAT | NO. ROW | NO. COL | STEPS/ COL | STEPS/ ROW | DELAY | COMIC PREF | CLOSEST FRAME |
| 1 | 2060 | 5 | 12 | 132 | 94 | 26 | 1 | 1, 6 |
| 2 | 2498 | 7 | 14 | 100 | 80 | 32 | 1 | 1, 7 |
| 3 | 2463 | 9 | 7 | 124 | 100 | 15 | 0 | 1, 5 |

-continued

COMPUTER FORMAT DATA TABLE

| FICHE | FORMAT | NO. ROW | NO. COL | STEPS/ COL | STEPS/ ROW | DELAY | COMIC PREF | CLOSEST FRAME |
|---|---|---|---|---|---|---|---|---|
| 4 | 42325 | 13 | 25 | 56 | 44 | 71 | 1 | 16, 11 |
| 5 | 42208 | 16 | 13 | 70 | 56 | 54 | 0 | 16, 10 |
| 6 | 48420 | 15 | 28 | 50 | 40 | 80 | 1 | 1, 14 |
| 7 | 48270 | 18 | 15 | 62 | 50 | 62 | 0 | 18, 10 |

In the exemplary embodiment three formats can be chosen corresponding to the three lenses. This application will discuss hereinafter how these formats are chosen. Assume, for example, that formats 2498, 42208 and 48270 are chosen. The computer is programmed such that fiche type 2 (format 2498) corresponds to a fiche having 7 rows and 14 columns.

Each step in the exemplary embodiment corresponds to a 1.8° revolution of the motor. Thus, the motor rotates once per 100 steps. The gearing and pulleys translate the steps a distance of 32 steps/mm or approximately 0.03 mm/step. The "stops per column" and "stops per row" are multiplied by 4 (a 2 place binary shift) to yield the actual number of steps. Based on the distance per step of stepper motors 90 and 91, the computer directs the motors to take 400 steps per column and 320 steps per row. The "delay factor" is the speed at which the steps are made. The computer also senses whether the COMIC mode or the CINE mode is preferred. A "1" in the "COMIC preferred" row indicates that the COMIC format is preferred. The closest frame indicates the frame number of the frame closest the upper right hand corner of the platen.

The actual scan speed may be faster than the nominal speed determined by the "delay factor", to accommodate lenses of slightly different focal lengths and non-standard material on the frames. For example, format 48420 moves only 5 mm, or 160 steps. Therefore, the processor signals stepper motor 90 to step the motor 160 steps during the time that a single sheet of copy paper passes through the copier.

Switches, separate from the computer, are adjusted depending on the format used in a particular machine to adjust the speed upward. By having separate adjustment switches, it is unnecessary to reprogram the processor for variations in lens and in the makeup of the frames. For example, if the original source material is made with very small margins, there may be insufficient tolerance during blow-back. The speed of the platen may have to be increased slightly to shrink the copy along the y axis. If the speed controls were only in the processor, reprogramming of the processor would be necessary, but by having the speed control in accessible switches, it may be possible to increase the platen speed in the y direction slightly. Also the focal length of the lens can be changed simultaneously with adjusting the speed if overblowing is a great problem.

As has previously been stated, motor control is obtained through controlling the number and rate of pulses to the stepper motors. The control means must be signaled with the correct format information. Although the format change could be accomplished with separate switches, the present invention ties the format change to lens position. The reason for that is that it ensures that the correct lens will be positioned for a chosen format.

As shown in FIG. 5, if handle 76 attached to lens support 25 is moved to the left, board frame 65 will contact switch 106 to close it. If lens support moves to its full extent to the right, it contacts switch 107. In the exemplary embodiment, the switch is arranged such that focus motor 80 actually contacts switch 107.

Figure 11:
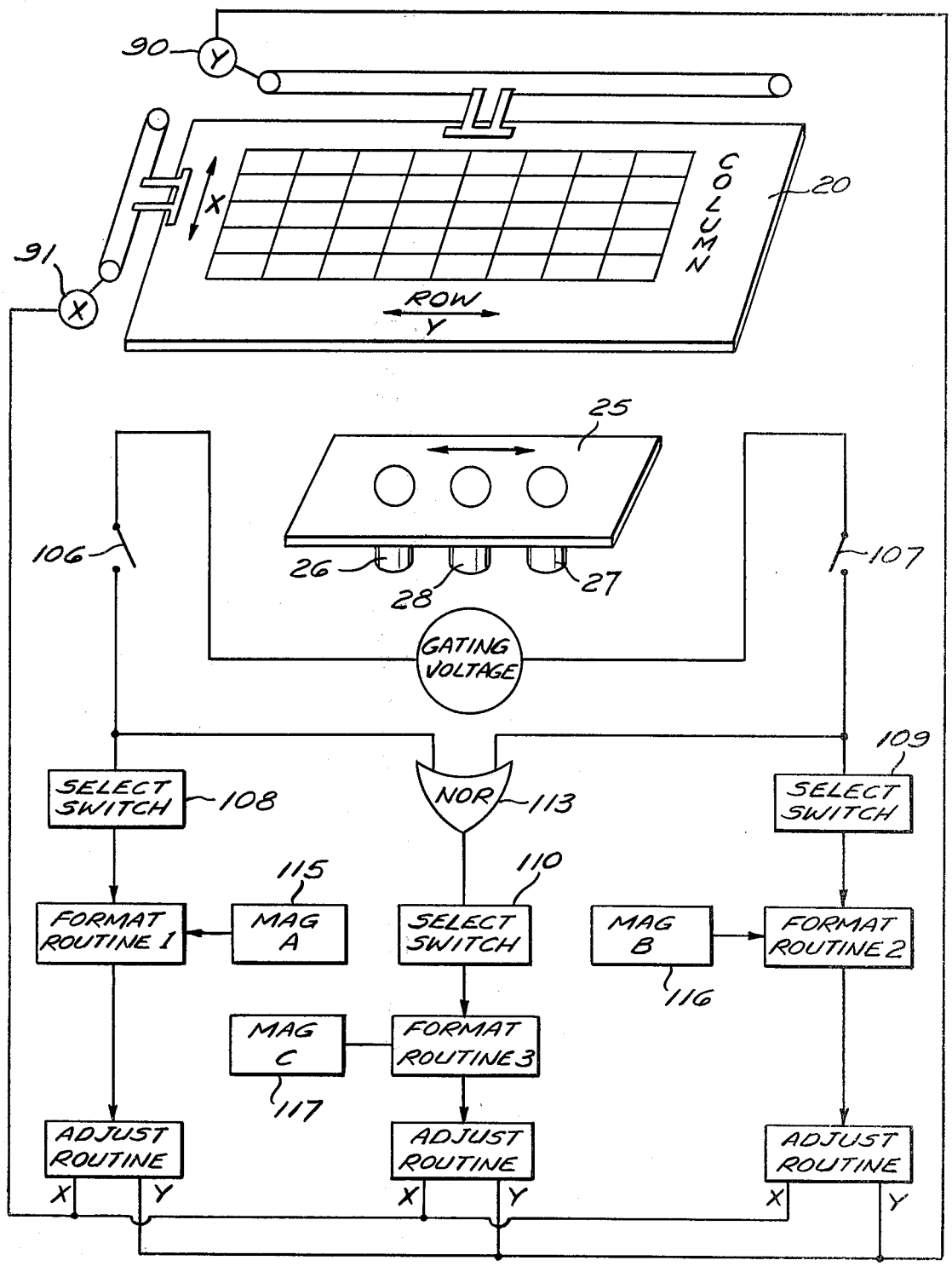
FIG. 11 is a schematic of the control means and its relationship to the platen, the platen moving means and the lens support.

Referring now to FIG. 11, assume that the lens support 25 has closed switch 106. This directs power to a select switch 108. There are three select switches which are in the form of dials. Depending on which formats are chosen, the select switch will direct the processor to a particular format routine. For example, if one of the formats is to be 2498, a 24 power lens would be mounted in the rightmost opening of lens support 25. Select switch 108 would be in position No. 2 which, as shown in the preceding table, directs the processor to format 2498. Note that when the rightmost lens 27 is in the light path, the lens support 25 will be moved to its leftmost position closing switch 106. If format 42208 microfiche is also to be copied, an approximately 42 power lens would be positioned in the left opening of lens support 25. Select switch 109 is dialed to 5 which directs the processor to the format 42208 routine. It will be noted that in the exemplary embodiment, there is no third switch. The third format is sensed by an absence of signals from switch 106 or 107. A logic circuit in the form of NOR gate 113 signals when both switches 106 and 107 are open which thereby chooses select switch 110 for the format choice. As an example, select switch 110 could be dialed to 7 to choose format 48270, and the computer would be directed to the routine for format 4827.

During scanning, the platen undergoes a novel movement. First, the acceleration is precisely controlled by controlling the current to the stepper motors. During the acceleration phase, additional torque is supplied by the motor to the platen. The manner in which the increased acceleration is provided electrically is discussed hereinafter.

Another problem deals with acceleration while a portion of the frame is over the light path. If the platen is accelerating during copying, the image will be blurred or compressed over the portion copied during acceleration. Therefore, the present invention provides for reversing the platen a short distance in a direction opposite the direction of scan, reversing the motor again and allowing the platen to accelerate to its format velocity over the short distance, Under direction from the control means, y stepping motor 90 then provides constant velocity motion in the y direction to platen 20 over the number of steps necessary to scan a frame. For example, as shown in the computer format data table, if format 2498 is chosen, the y motor will advance 320 (80×4) steps to traverse the frame at constant velocity. After scanning is complete, the platen decelerates over a portion of the next frame. To initiate copying of that frame, the platen must be reversed over the distance of deceleration as well as the additional distance for acceleration.

As an example, assume that frames B8, B9 and B10 are to be copied. The present machine is arranged to print the last frame first so that it appears on the bottom of the stack of copies. This greatly assists in collating copies. The control circuitry therefore directs the x and y motors to position frame B10 in the light path. When printing is initiated, the platen first moves a small distance to the left, approximately ½ frame so that the light path is through a portion of frame B11, the frame immediately to the right of frame B10. The y motor then begins accelerating until the format speed is reached when or before the right-hand side of frame B10 enters the light path. The y motor then rotates at constant speed moving the platen to the right until the left-hand side of frame B10 passed through the light path. The motor will then decelerate over a portion of adjacent frame B9. In the exemplary embodiment, the deceleration takes place over approximately ¼ of the adjacent frame. Thereafter, the platen would retreat again so that the light path is approximately ½ of the way into frame B10, and the platen would accelerate until the right edge of frame B9 passed through the light path. This process is repeated for all copying.

If more than one set of copies is desired, the machine continues to repeat its sequence. It is seen that the bottom copy emerging into tray 45 will be frame B10 followed in order from the bottom by frames B9 and B8. The print is face up so that when the copies are removed from tray 45, they will be in the order B8, B9 and B10 from top to bottom, the correct order. Additional sets of these copies would be fed on top of the first pile.

In contrast to the precision scanning movement required by the y motor, the speed of movement from frame to frame is not crucial, only the distance (number of steps) is. Assume, once again, that the machine is set at the 2498 format and frame A1 is currently in the light path. The location is stored in the processor. Assume further that the operator desires to view frame D10. The processor computes that it will have to move down three rows from row A to row D. As shown in the computer format data table, x motor 91 must make 400 steps to traverse a column frame. As there are three frames that must be traversed in the x direction, the processor directs the x motor to move 1200 steps. Simultaneously, the y motor must move nine frames in the horizontal direction from column 1 to column 10. Knowing that it has 320 steps along a row to traverse a frame, the processor calculates that the motor must turn through 2880 steps until it reaches the 10th column. Because the motors operate simultaneously during a portion of the travel, the initial platen movement is diagonal followed by movement along the y axis.

Alignment

The invention also has means for modifying the alignment between frames from standard or nominal alignment in order to accommodate variations in the microfiche. These variations can take two forms, skewing and improper spacing. The alignment means of the present invention operates on a principle such that the total deviation from one side of the microfiche to the other is assumed to be constant. The total deviation is computed, and an average deviation is attributable to each frame. Thereafter, as the controller moves the platen between frames, the platen is moved its nominal distance plus the deviation. It is recognized that there could be a negative deviation, in which case, the controller is considered to add algebraically the negative deviation.

Alignment is accomplished in the following manner. After microfiche is loaded into the platen, the operator pushes the "view" button (FIG. 10). The machine automatically positions the upper left-hand frame in the light path. Next, the operator presses the "align" button. This automatically moves platen 20 to the left to position the upper right frame in the light path. For convenience, reference can be had to the microfiche shown in FIG. 11. The operator then determines if the frame is centered with respect to centering lines 19 on view screen 18. If not, the operator can move the platen by means of x vernier keys 120 activating the x stepper motor and y vernier keys 121 actuating the y stepper motor (FIG. 10).

Figure 12:
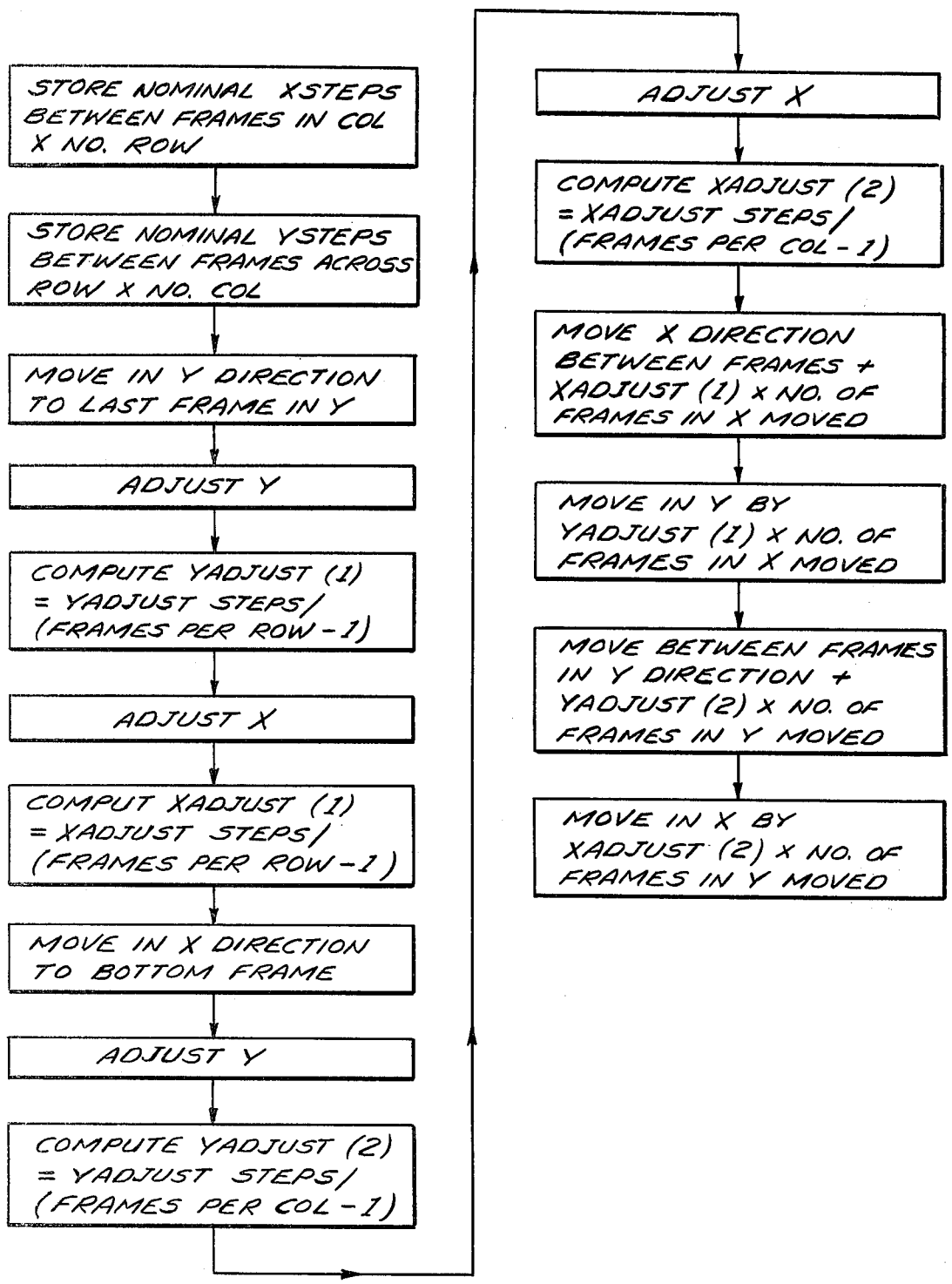
FIG. 12 is a flow chart for the align function.

The controller stores the number of steps moved in the y direction which it uses to determine a correction factor indicated as YADJUST(1) in the flow chart of FIG. 12. The correction factor is determined by dividing the number of y steps in the correction by one less than the number of frames per row. This factor then determines the portion of the error attributable to each space between frames, and there is one less space between frames than there are frames. YADJUST(1) is a factor that is used to correct for improper spacing between the frames.

Simultaneously, a factor XADJUST(1) is used to correct any angular misalignment of the microfiche images with respect to the edge of the film. The operator adjusts the frame up and down by use of vernier keys 120 and the number of steps taken by the y motor is determined. The factor XADJUST(1) is computed by dividing the number of steps made for the adjustment in the x coordinate by one less than the number of frames per row.

The operator now presses the "align" button again, automatically moving the platen inward to position the lower right frame in the viewing screen. Once again, by means of vernier keys 120 and 121, the operator centers the image between centering lines 19. This computes a factor XADJUST(2), which is a correction factor for improper spacing in the x axis. It is computed by dividing the number of steps taken by the x motor during adjustment in the x direction and dividing it by one less than the number of frames per column. To compensate for angular misplacement of the frames, factor YADJUST(2) is computed by dividing the number of steps necessary to center the frame along the y axis and dividing that number by one less than the number of frames per column. Thereafter, the operator presses the "align" button again, and the platen moves diagonally back to the initial position. If the operator wishes, the alignment procedure can be done a second time for fine tuning the alignment. The control means is programmed to change the XADJUST and YADJUST factors slightly for each iteration.

The use of the adjustment factors will be explained by way of the following example. Assume that the microfiche has 10 frames across in the y direction and 6 frames down in the x direction. Assume further that that translates to 1000 x steps and 500 y steps. In making the first adjustment (XADJUST(1) and YADJUST(1)), the platen automatically moves the 1000 steps in the y direction. Assume further that in order to center the frame, the operator must rotate y motor 90 steps. YADJUST(1)=90/(10−1)=10. Assume further that the x motor had to move 45 steps through the use of x vernier 120. XADJUST(1)=45/(10−1)=5.

When the "align" button is pressed a second time, the platen moves to position the bottom right frame in the light path. Assume that the frame had to be moved 40 steps in the x direction and 30 steps in the y direction. YADJUST(2) and XADJUST (2) are then computed; YADJUST(2)=30/(6−1)=6. XADJUST(2)=40/(6−1)=8.

Once the adjustment steps are completed, assume that the machine is asked to move from frame A1 to frame A3. This is accomplished by pressing first the key 121 marked "A" followed by keys "0" "3". Using the same assumptions above, such a move in the y direction would normally take 200 y steps and no x steps. However, because of the correction factors, a two frame move will require 20 (10×2) additional steps. Therefore, a two frame y move will be 220 steps rather than 200 steps. Likewise, instead of having no x component to the move, a two frame y move will need a correction factor of 10 (5×2) x steps. If next the machine must move 4 frames in the x direction, the controller will automatically move an additional 32 spaces (8×4). Instead of having no input from the y motor, a move of 4 frames will require 24 y steps (6×4).

Frequently, all of the microfiche being copied at one time will have been produced on the same machine, and it may be unnecessary to repeat the alignment routine for each microfiche. However, because of the ease with which alignment is accomplished, it is easy for one to align each new microfiche.

As shown in FIG. 10, the present invention has a "reset" button. This button must be activated to cause the controller to pick a new branch upon movement of the lens support. The reset control allows less complicated circuitry to detect what lens is being used. Lens switches 106, 107 do not have to be constantly monitored.

Motor Control Circuitry

Figure 13:
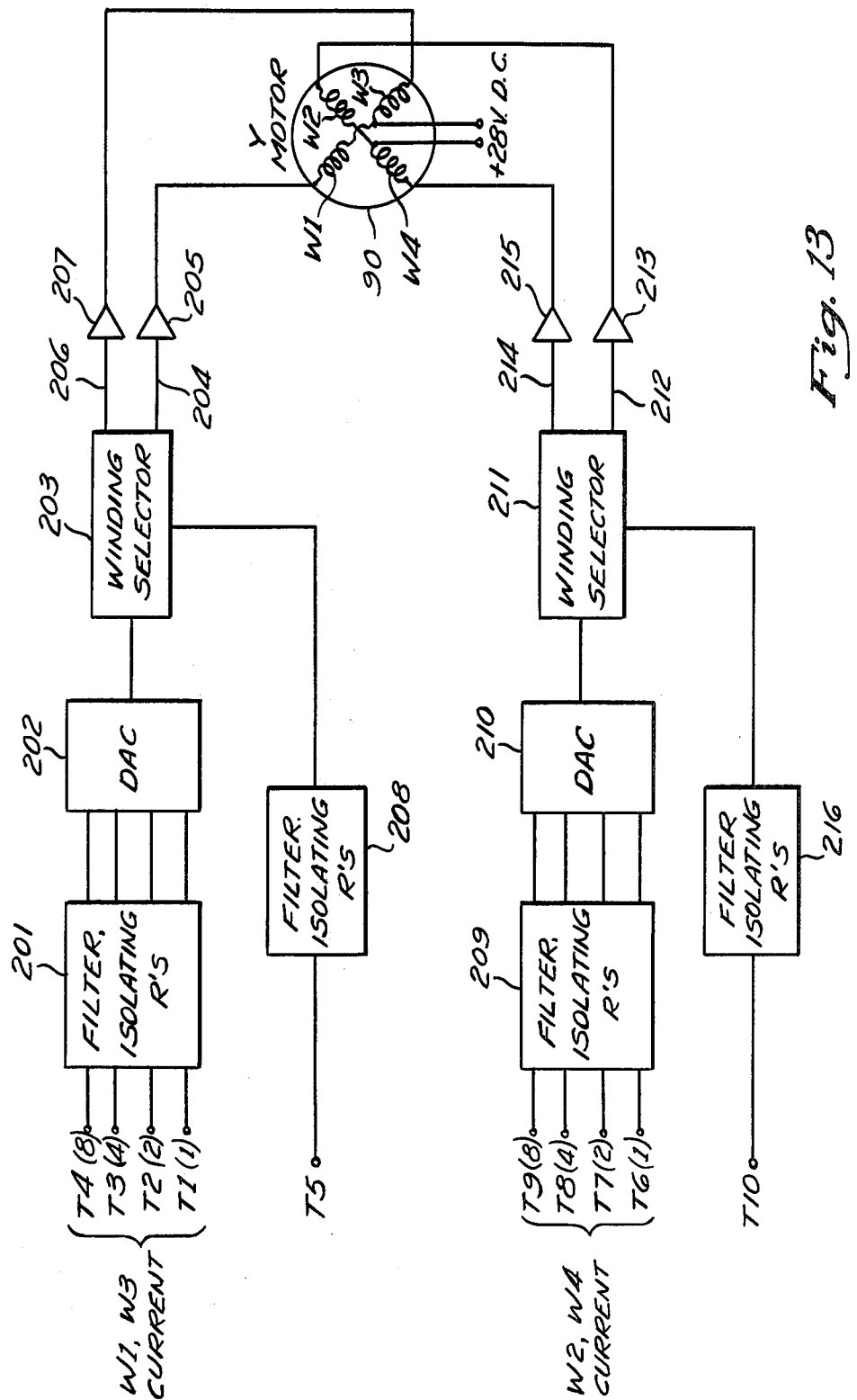
FIG. 13 is a block diagram for the control circuit for the stepper motor moving the platen in the y direction.

FIG. 13 is a block diagram of the circuitry employed to implement motion commands for the y direction motor as directed by the appropriate routine corresponding to the selected format. Y motor 90 is a stepping motor having four windings W1, W2, W3 and W4. The windings are disposed at successive 90° phase angles, and are divided into fifty segments each. While for simplification of description the operation of the control circuit is described hereinafter as if stepping were accomplished in only four 90° steps per rotor revolution, it should be understood that because of the winding segmentation each step actually involves a rotation of 1.8°.

The torque developed by the motor at any time is determined by the amount of current flowing in the windings and the angular position of the rotor relative to the energized windings. While motor 90 could be operated by successively energizing each of the windings in order, one winding at a time, in the preferred embodiment an overlap between successive winding energizations is introduced to reduce or eliminate a jerking motion that would otherwise result from abrupt shifts between windings. As described in detail below, the invention also contemplates the energization of individual windings with shaped current waveforms, rather than square waves with abrupt rise and fall characteristics, to further reduce jerking.

In the embodiment shown, energization of 180° opposed motor windings W1 and W3 is controlled by one circuit, while energization of the other 180° opposed motor windings W2 and W4 is controlled by a second circuit of similar design. The control circuit for windings W1 and W3 comprises a group of input terminals T1, T2, T3 and T4 adapted to receive binary coded input signals from the controller, and connected through a filtering and isolating circuit 201 to a digital to analog converter (DAC) 202. A winding selector circuit 203 received the DAC output and is connected in a first output circuit via output lead 204 and amplifier 205 to winding W1, and in a second output circuit via output lead 206 and amplifier 207 to winding W3. Only one of these two windings is energized at any time, the appropriate winding being selected by winding selector circuit 203 in response to a signal from the controller. An input terminal T5 is provided to receive the controller signal and transmit it through a filter and isolating circuit 208 to winding selector circuit 203.

An identical circuit is provided for control of windings W2 and W4. Input terminals T6, T7, T8 and T9 receive binary coded input signals, which signals are transmitted through filter and isolating circuit 209 and converted to analog form by DAC 210. A winding selector circuit 211 receives the output of DAC 210 and is provided with a first output circuit comprising output lead 212 and amplifier 213 connected to winding W2, and a second output circuit comprising output lead 214 and amplifier 215 connected to winding W4. Winding selection is controlled as in the first control circuit by a signal received at input terminal T10 and transmitted through a filter and isolating circuit 216 to winding selector circuit 211.

The general manner in which the motor windings are energized will now be described. The magnitude of energizing current delivered to windings W1 and W3 is determined by the pattern of input pulses received from the controller at input leads T1–T4. DAC 202 establishes a binary relationship among T1–T4, with T1 representing the least significant bit and T4 the most significant bit. The current delivered to windings W1 and W3 is thus controlled by the pattern of signals at input terminals T1–T4. Similarly, the current magnitude delivered to windings W2 and W4 is controlled by the signal pattern at input terminals T6–T9.

Motor velocity is controlled by the rate at which energizaton is stepped from winding to winding, which in turn is controlled by the oscillation rate of the signals delivered to terminals T5 and T10. Assume first that a pattern of pulses is present at terminals T1–T4 but not at terminals T6–T9, the rotor is aligned with W1, and the signal at terminal T5 is such that winding selector circuit 203 directs an energizing signal to winding W1 but not to winding W2. A signal pattern is then applied to terminals T6–T9, with the signal at terminal T10 such that winding selector circuit 211 causes winding W2 to be energized. The rotor begins to rotate toward a midpoint between W1 and W2, at which point the energization of W1 is reduced below that of W2 and then terminated so that the rotor continues rotating to an alignment with W2. In the next step winding W3 is energized by applying a new signal pattern to terminals T1–T4 and negating the signal at T5. Winding W4 is then energized and winding W2 de-energized as the rotor passes winding W3 by terminating the signal pattern at T6–T9, applying a new signal pattern to T6–T9, and negating the signal at T10 such that winding selector circuit 211 now directs energizing current to winding W4. Finally, winding W1 is reenergized and winding W3 de-energized as the rotor passes winding W4 by terminating th signal pattern at T1-T4, applying a new signal pattern to those terminals, and negating the signal at T5 such that selector circuit 203 now directs current to winding W1.

Figure 14:
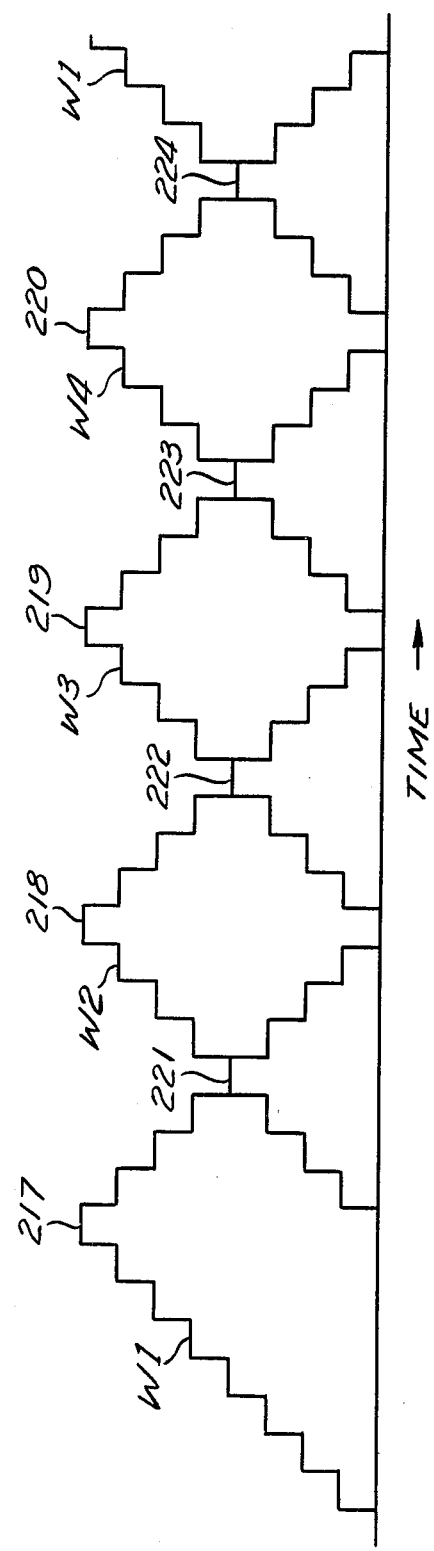
FIG. 14 is a diagram illustrating the current waveform applied to the y stepper motor for each step during scanning.

To enhance smooth movement of its rotor and thereby improve the quality of microfiche copies, the windings of y motor 90 are sequentially energized with shaped current waveforms characterized by stepped rises and falls generally approximating a sine wave. Current waveforms for windings W1-W4 are plotted against time in FIG. 14. Beginning at the left hand side of the figure with a zero energization for W1, the signal pattern at terminals T1-T4 of FIG. 13 is sequenced through a series of combinations such that the current through W1 increases in a step fashion to a peak at 217, and then decreases back to zero in a symmetrical step fashion.

The rotor is aligned with W1 concurrently with its peak energization 217, at which time sequencing of a signal pattern commences at T6-T9 to produce a similar energization waveform for W2. At the peak 218 of the W2 energization the W1 current has fallen to zero, the rotor is aligned with W2, and a repeat of the sequenced signal pattern commences at T1-T4. At this time, however, the control signal established at T5 is negated, causing energizing current to now commence flowing through W3 rather than W1. The current through W3 likewise increases in step fashion to a peak 219 at which time the rotor is aligned with W3, the current through W2 had dropped to zero, application of a new signal pattern at T6-T9 begins, and the signal at T10 is negated to direct the new energizing signals to W4 rather than W2. In the same manner the current through W4 steps up to a peak 220 and then steps back to zero.

Successive current waveforms for W1-W4 are 90° out of phase with the waveform for the previous winding. At cross-over points 221, 222, 223 and 224 between successive waveforms the rotor is located equidistantly between the two energized windings. The result is a precisely controlled motor movement that substantially eliminates jerking of y motor 90 and resulting distortions in the final microfiche copy.

Y motor 90 rotates as the sequential energization of the motor windings progresses as described above. In the preferred embodiment the motor is controlled such that, after a lens has been aligned at the beginning of a frame, y motor 90 is reversed and moves the microfiche card backwards by a predetermined amount, such as one-quarter frame length. The motor is then accelerated in a controlled fashion so that, by the time the beginning of the frame has again reached the lens, the platen is moving at or near full copying speed. Control over acceleration is achieved by controlling the buildup of motor velocity over the acceleration period before the frame is reached. Motor velocity at any given time is controlled in turn by the frequency at which the signals at T5 and T10 are alternated, and thus by the rate at which cyclic energization of the windings proceeds. Initially, with the motor beginning at rest, the signals at T5 and T10 are alternated at a relatively slow rate. As acceleration progresses the signal alternation rate at T5 and T10 progressively increases as rapidly as the motor is capable of keeping up, until full speed is achieved and the alternation rate reaches a steady state level.

The torque control provided through binary-related inputs at T1-T4 and T6-T9 are coordinated with the velocity control signals provided at T5 and T10 such that new signal patterns are applied to T1-T4 and T6-T9 each time the signal at their associated terminals T5 and T10 changes. Once the motor is up to speed and copying has commenced, motor movement process at a constant rate for the distance determined by the format selection, and then continues to move the appropriate number of turns to align with the beginning of the next frame.

Figure 15:
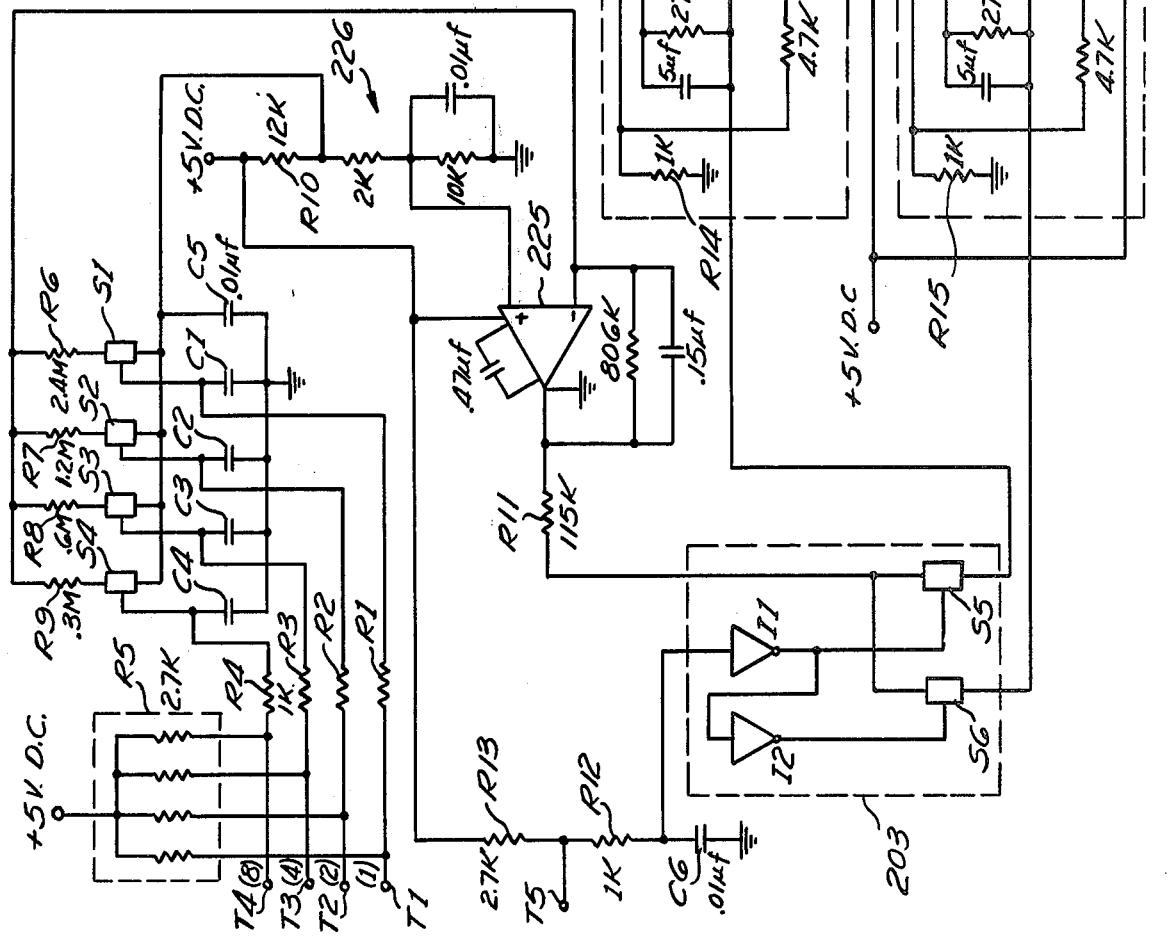
FIG. 15 is a schematic diagram of the control circuitry for two phases of the y stepper motor.

Referring now to FIG. 15, a schematic diagram of the circuit for energizing windings W1 and W3 of y motor 90 is shown. An identical circuit with inputs at T6-T10 is utilized to control the energization for windings W2 and W4. Input terminals T1, T2, T3 and T4 are connected respectively through isolating resistors R1, R2, R3 and R4 to junctions between filter capacitors C1, C2, C3 and C4 and the control terminals of switches S1, S2, S3 and S4. Terminals T1, T2, T3 and T4 are also connected respectively through a resistor network R5 to a regulated 5 volt DC source to provide further isolation and insure that the input signals at T1-T4 successfully actuate their respective switches S1-S4.

Switches S1, S2, S3 and S4 are respectively connected through binary weighted resistors R6, R7, R8 and R9 to the inverting input of an operational amplifier 225. The other poles of switches S1-S4 are connected in common to a regulated 5 volt DC supply through resistor R10, through an RC network 226 to a reference input to operational amplifier 225, and to an additional filtering capacitor C5. Switches S1-S4 and resistors R6-R9 together form a DAC for the digital inputs at T1-T4. An analog signal derived from the instantaneous pattern of input signals at T1-T4 is supplied to the negative input of operational amplifier 225, the output of which is connected through a resistor R11 to corresponding poles of two switches S5 and S6 in winding selector circuit 203.

Winding selector 203 further comprises a first inverter I1 having its input connected to T5 through an isolating and filter network which comprises resistors R12 and R13 and capacitor C6, and its output connected to a second inverter I2. The outputs of inverters I1 and I2 are connected respectively to the controls for switches S5 and S6. The opposite poles of switches S5 and S6 are connected in turn to amplifier circuits 205 and 207. The two amplifier circuits are identical, and a description of one will apply to the other also. Amplifier circuit 205 comprises an operational amplifier 227 with its positive input connected to switch S5, a ground reference at its negative input, appropriate feedback circuitry, and an output RC circuit 228 connected to the base of a transistor T1.

Transistor T1 is connected in an energizing circuit for winding W1, with its collector connected to one end of W1 and its emitter grounded through resistor R14. Similarly, an output transistor T2 of amplifier 207 has its collector connected to one end of winding W3 and its emitter connected to ground through resistor R15 for energizing W3. Motor winding current is provided from a 28 volt regulated DC source through resistor R16 to a common node 228 for W1 and W3. Energizing current flows through one or the other of W1 and W3, depending upon which of transistors T1 and T2 is actuated.

The selection of windings and the control over winding current provided by the circuit of FIG. 15 will now be described. Assuming that no signal is applied to terminal T5, inverter I1 produces a positive output which closes switch S5, connecting the amplified DAC output to operational amplifier 227 of amplifying circuit 205.

This signal is amplified by operational amplifier 227 and applied to the base of transistor T1, driving the transistor into conduction by a proportional amount. Thus, as the pattern of input signals at terminals T1–T4 is run through a stepping sequence as described above, the winding energizing current transmitted by transistor T1 varies in proportion to the analog signal produced in response to the digital inputs at T1–T4. When the input energization sequence for W1 is completed and W3 is ready for energization, a signal is applied at T5 which removes the positive output from I1 and produces a positive output from I2, thereby turning switch S6 on and switch S5 off. A control current is then induced through W3 in proportion to the amplified gating signal delivered to the base of transistor T2. By an appropriate sequencing of digital inputs to T1–T4. (and T6–T9 of FIG. 13) the stepped energizing waveforms illustrated in FIG. 14 may be achieved.

Figure 16:
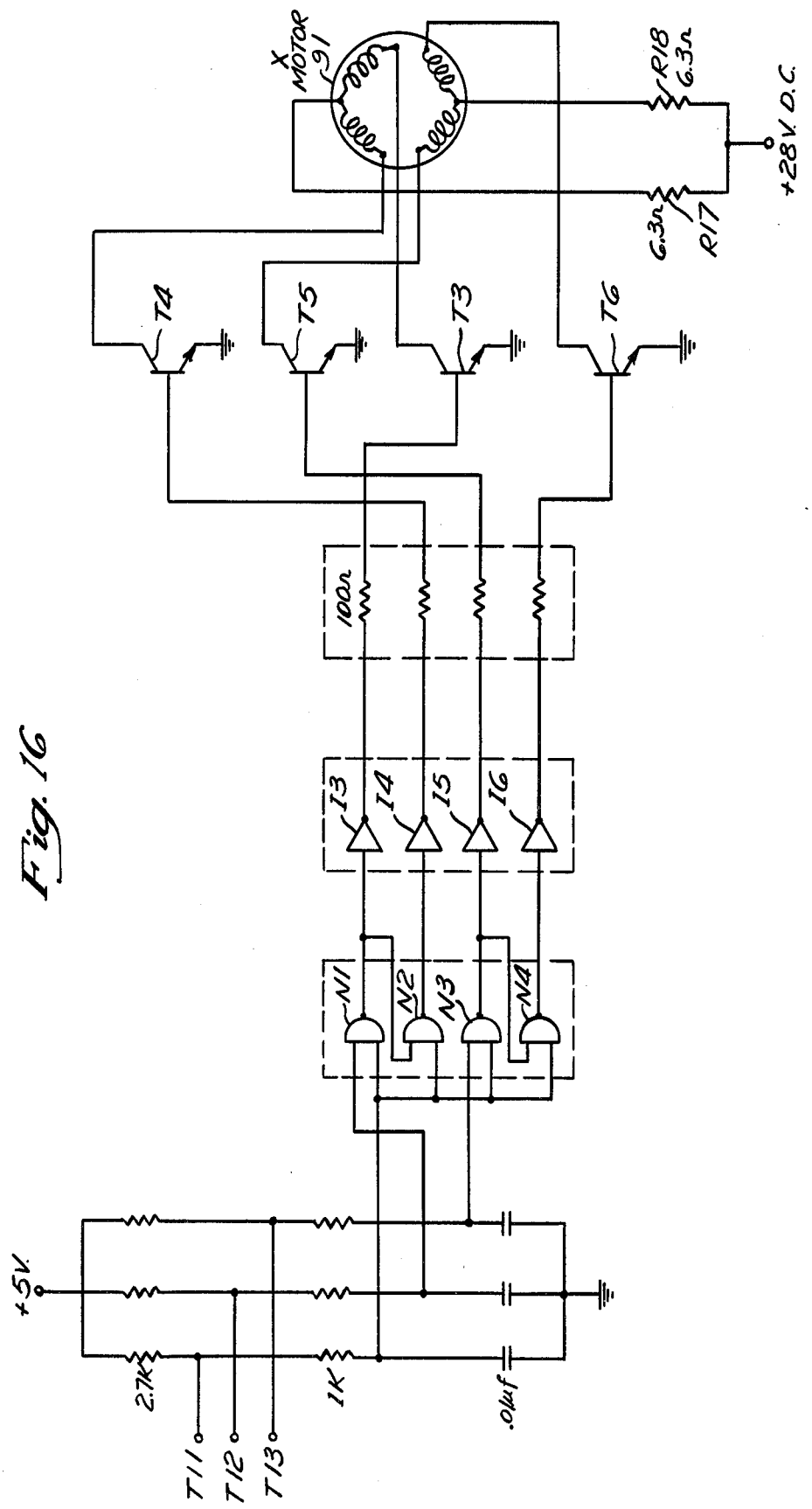
FIG. 16 is a schematic diagram of control circuitry for the x stepper motor.

Referring now to FIG. 16, a schematic diagram of the control circuit for x motor 91 is shown. A first input terminal T11 adapted to receive input signals from the controller is connected through an isolating and filtering RC circuit to one input of each of four NAND gates N1, N2, N3 and N4. A second input terminal T12 is connected through the isolating and filter network to the second input of N1, while a third input terminal T13 is connected through the isolating and filter network to the second input of N3. The outputs of N1 and N3 are respectively connected to second inputs for N2 and N4. The outputs of N1, N2, N3 and N4 are respectively applied to the base of transistors T3, T4, T5 and T6 after inversion by inverters I3, I4, I5 and I6. The collector-emitter circuits of each of these transistors are connected between ground and respective windings of x motor 91. Energizing current for the motor windings is provided from a 28 volt regulated DC source through resistors R17 and R18 to common points for the two pairs of 180° opposed windings.

In operation, sequential input signal patterns are applied from the controller to terminals T11, T12 and T13 at a rate corresponding to the desired stepping rate. The successive signal patterns are selected such that the windings of x motor 91 are energized sequentially, with an overlap between the energization of adjacent windings if desired. X motor 91 is thus controlled to impart a controlled movement to the platen in the x direction.

Thus, an improved microfiche reader printer has been disclosed which helps solve many of the problems of the prior art especially those relating to providing the ability to print microfiche of different formats. It is apparent that various modifications could be made to the exemplary embodiment within the scope of the invention. All such changes and modifications coming within the scope of the appended claims are embraced thereby.

We claim:

1. The method of correcting for out of tolerance placement of frames in an array, the array having generally regularly spaced rows and columns, wherein a first stepper motor moves the array columnwise along a first axis, and a second stepper motor moves the array rowwise along a second axis, the frames of a correctly produced array being separated from each other by a nominal distance along each axis, the method comprising the steps of:

positioning the array such that a predetermined frame occupies a predetermined position, moving the array a distance corresponding to a number of steps made by one of the motors along one of the axes such that a frame farthest from said predetermined frame along the one of said axes occupies the predetermined position, dividing the number of steps made by the one of said motors during the preceding move by one less than the number of frames moved to obtain a quotient and adding the quotient to the nominal distance between frames along the axis moved to yield an average actual distance between frames along the axis moved, whereby the average actual distance is thereafter used in future positioning of selected frames of the array.

* * * * *